United States Patent
Drake et al.

(10) Patent No.: US 11,024,299 B1
(45) Date of Patent: Jun. 1, 2021

(54) PRIVACY AND INTENT-PRESERVING REDACTION FOR TEXT UTTERANCE DATA

(71) Applicant: Amazon Technologies, Inc., Seattle, WA (US)

(72) Inventors: Thomas Drake, Seattle, WA (US); Oluwaseyi Feyisetan, Seattle, WA (US); Borja de Balle Pigem, Cambridge (GB); Tom Diethe, Cambridge (GB)

(73) Assignee: Amazon Technologies, Inc., Seattle, WA (US)

(*) Notice: Subject to any disclaimer, the term of this patent is extended or adjusted under 35 U.S.C. 154(b) by 35 days.

(21) Appl. No.: 16/143,403

(22) Filed: Sep. 26, 2018

(51) Int. Cl.
*G10L 15/00* (2013.01)
*G10L 15/04* (2013.01)
*G10L 15/197* (2013.01)

(52) U.S. Cl.
CPC .................. *G10L 15/197* (2013.01)

(58) Field of Classification Search
CPC ............ G06F 16/9535; G06F 16/9032; G06F 16/24575; G06F 16/3331; G06F 16/3338; G06F 16/90332; G06F 17/278; G06F 16/00; G06F 16/35; G06F 16/285; G06F 16/3344; G06F 16/3347; G06F 16/355; G06F 16/93; G06F 21/575; G06F 40/279
See application file for complete search history.

(56) References Cited

U.S. PATENT DOCUMENTS

| | | | | |
|---|---|---|---|---|
| 7,383,183 B1* | 6/2008 | Davis | ............ | G06Q 50/22 704/235 |
| 8,713,021 B2* | 4/2014 | Bellegarda | ............ | G06K 9/6223 707/739 |
| 9,641,676 B1* | 5/2017 | Mandic | ............ | H04M 3/42221 |
| 9,684,693 B1* | 6/2017 | Petrou | ............ | G06F 16/951 |
| 9,686,242 B2* | 6/2017 | Shrivastava | ............ | H04W 4/029 |
| 9,787,835 B1* | 10/2017 | Pycko | ............ | H04M 3/5166 |
| 10,002,639 B1* | 6/2018 | Gaeta | ............ | G11B 27/031 |
| 10,057,287 B2* | 8/2018 | Rodniansky | ............ | H04L 63/20 |
| 10,108,306 B2* | 10/2018 | Khoo | ............ | G06F 16/00 |

(Continued)

OTHER PUBLICATIONS

Chen, R., Ács, G., Castelluccia, C.: Differentially private sequential data publication via variable-length n-grams. In: Proc. of CCS, pp. 638-649. ACM (2012) (Year: 2012).*

*Primary Examiner* — Michael Ortiz-Sanchez
(74) *Attorney, Agent, or Firm* — Eversheds Sutherland (US) LLP

(57) ABSTRACT

Systems, methods, and computer-readable media are disclosed for providing privacy and intent preserving redactions of text derived from utterance data. Certain embodiments provide new techniques for using MadLib-style replacements to replace one or more terms or phrases in a text string. Example methods may include receiving utterance data and determining a public portion and a private portion of the utterance data. Certain methods include determining a cluster of candidates having a same semantic context as the private portion and identifying from within the cluster of candidates a first candidate. Certain methods include determining a redacted utterance comprising the public portion of the utterance and the first candidate. Certain methods include providing the redacted utterance to downstream systems and processes.

17 Claims, 5 Drawing Sheets

(56) References Cited

U.S. PATENT DOCUMENTS

| | | | |
|---|---|---|---|
| 10,127,401 B2* | 11/2018 | Stuntebeck | G06F 21/6245 |
| 10,382,620 B1* | 8/2019 | Allen | H04M 1/72577 |
| 10,468,026 B1* | 11/2019 | Newman | G10L 15/08 |
| 2007/0081428 A1* | 4/2007 | Malhotra | G16H 15/00 |
| | | | 369/25.01 |
| 2013/0266127 A1* | 10/2013 | Schachter | G10L 25/48 |
| | | | 379/88.01 |
| 2014/0095634 A1* | 4/2014 | Govindaraman | G06F 21/6245 |
| | | | 709/206 |
| 2016/0241546 A1* | 8/2016 | Arnady | H04L 63/0428 |
| 2017/0124152 A1* | 5/2017 | Nerurkar | G06F 16/2465 |
| 2018/0241703 A1* | 8/2018 | Feuz | G06Q 10/10 |
| 2018/0365560 A1* | 12/2018 | Qiao | G06N 3/0445 |
| 2019/0238516 A1* | 8/2019 | Weggenmann | G06F 17/2795 |

* cited by examiner

PRIVACY AND INTENT-PRESERVING REDACTION FOR TEXT UTTERANCE DATA

BACKGROUND

Private data that has been publicly compromised may carry a high cost in terms of reputation and fines to the data custodians charged with securing the curated information. Recently, comprehensive data privacy laws, also known as consumer privacy laws, that prohibit the disclosure or misuse of information held on private individuals have been adopted in numerous countries throughout the world.

The unintended disclosure and accidental publication of private data that leads to the identification of a specific individual are two common causes of privacy breaches in recent history. While it is possible to define rules and design access policies to improve data security, understanding the full spectrum of what can constitute a potential privacy infraction can be hard to predict a-priori. Common data privacy solutions such as regex pattern matching, ad-hoc filters, and anonymization strategies are provably non-private. This is because such approaches cannot anticipate, and do not account for, the potential side knowledge an attacker can use in conjunction with a released dataset. In other words, it can be difficult to identify which subsets of seemingly innocuous data stored in a system may lead to a privacy breach when coordinated with additional information obtained outside of the system.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Private data that has been publicly compromised may carry a high cost in terms of reputation and fines to the data custodians charged with securing the curated information. Consequently, the development and implementation of comprehensive data privacy solutions and data access policies is critical. Unfortunately, common data privacy solutions such as regex pattern matching, ad-hoc filters, and anonymization strategies are provably non-private. This is because such approaches cannot anticipate, and do not account for, the potential side knowledge an attacker can use in conjunction with a released dataset.

Ensuring sufficient data privacy protections is especially challenging when data streams consist of utterance data collected from one or more individuals. Such utterance data may be collected during the normal course of operation when using a home or consumer device. For example, a consumer may use one or more smart home devices to order one or more items from an online storefront (e.g., "Pat, please order milk and a pack of diapers."). For proper functioning, the smart home device may need to listen to, and processes, the utterance data from one or more individuals. In some instances, this utterance data may include Non-public Private Personal Information (NPPI), such as inadvertent conversation containing personal information, names, genders, passwords, medical information, addresses, etc. Complicating matters further, the utterance data may include information that may itself be insufficient to identify one or more individuals, but that may be used in conjunction with secondary data to identify personal information regarding one or more individuals.

Embodiments of the disclosure include devices, systems, methods, computer-readable media, techniques, and methodologies for providing privacy and intent preserving redactions of text derived from utterance data. Certain embodiments provide new techniques for using MadLib-style replacements to replace one or more terms or phrases in a text string. Although described primarily in the context of text-based utterance data, aspects of the disclosure may be applied to any form of language, including, for example, a verbal or voice command having both public and private portions. Further, as used herein, MadLib includes any suitable privacy preserving generative model for in-place redatction, for example, for identifying a word, subphrase, phrase or sentence with an alternative word, subphrase, phrase or sentence having the same or similar semantic context so as to preserve sentiment. This may be considered similar to the phrasal template game MadLib where a player prompts others for a list of words to substitute for blanks in a story, thereby maintaining the context, and thus sentiment, of the story while changing its meaning.

Figure 1:
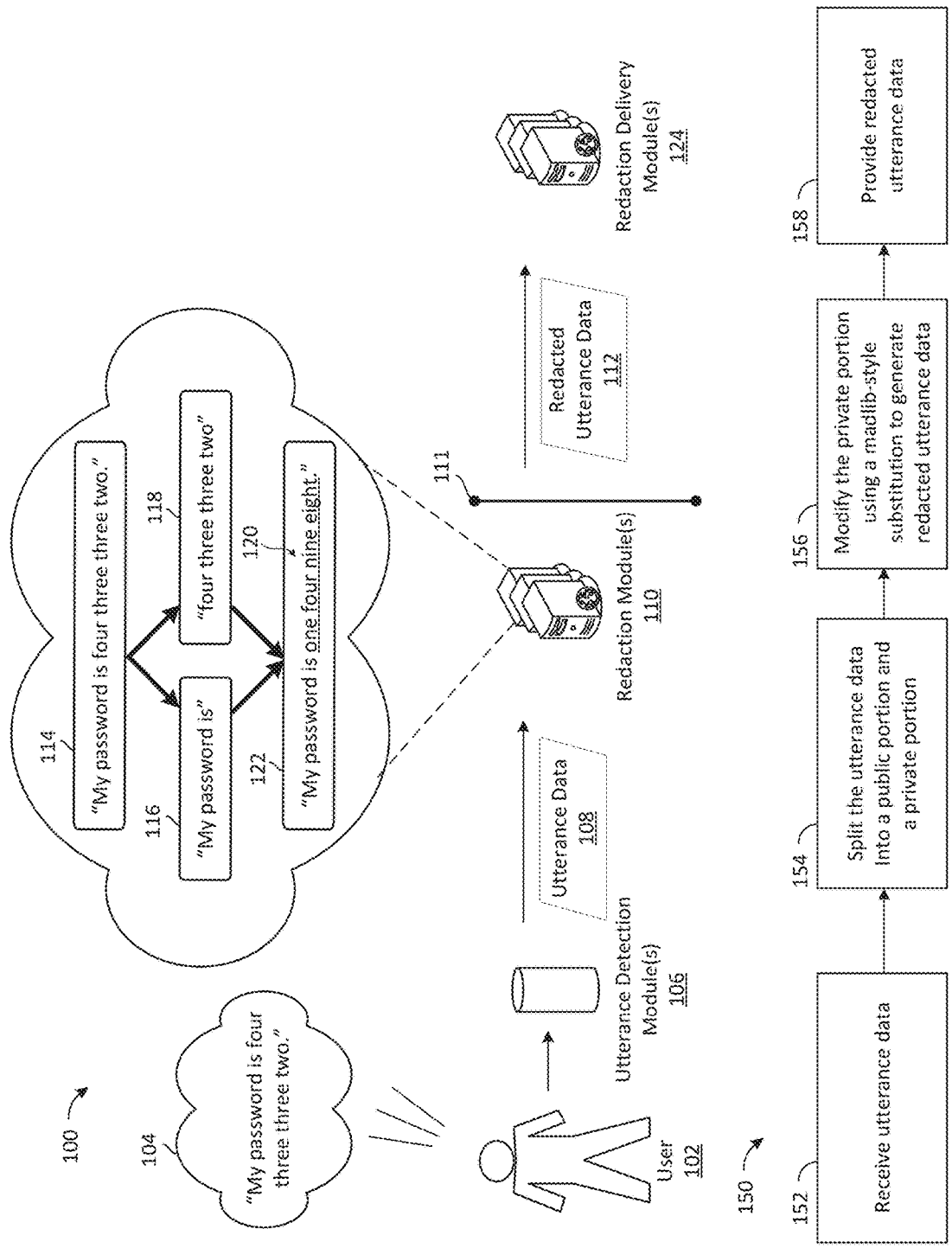
FIG. 1 is a hybrid system and process diagram illustrating a privacy and intent preserving redaction scheme for text derived from utterance data in accordance with one or more example embodiments of the disclosure.

Referring to FIG. 1, an example use case 100 is depicted for providing privacy and intent preserving redactions for text derived from utterance data in accordance with one or more example embodiments of the disclosure. As illustrated in FIG. 1, a user 102 may speak one or more utterance(s) 104. The utterance 104 may be include any type of spoken language, such as, for example, a statement, a question, one or more words, a conversation, and/or one or more verbal or voice-based commands.

In some embodiments, the utterances 104 may be received by an utterance detection module 106. The utterance detection module 106 may include any suitable processor-driven device including, but not limited to, a mobile device or a non-mobile, e.g., a static, device. For example, the utterance detection module 106 may include a smart home device, a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

In some embodiments, the utterance detection module 106 may generate utterance data 108 based on the utterance 104. In some embodiments, the utterance data 108 may include the utterance 104 as well as metadata associated with the utterance 104, such as, for example, a timestamp, a date, a user account identification, a user identification, and/or an utterance type, although other metadata are within the contemplated scope of the disclosure. In some embodiments, the utterance data 108 may include a text-based transcription of the utterance 104. For example, the utterance 104 may be stored in the utterance data 108 as one or more strings.

In some embodiments, the utterance detection module 106 may provide (e.g., send, transmit) the utterance data 108 to a redaction module 110. The redaction module 110 may include any suitable computing device capable of receiving and/or generating data including, but not limited to, a remote server or servers; a desktop computer; a laptop computer; a workstation, a cloud-based computing environment, resource, platform, or service, a distributed system, or the like. In some embodiments, the redaction module 110 may receive the utterance data 108 from the utterance detection module 106 over one or more communication networks. In some embodiments, the redaction module 110 may receive the utterance data 108 from the utterance detection module 106 in response to the utterance detection module 106 receiving the utterance 104.

In some embodiments, the redaction module 110 may processes the utterance data 108 to generate redacted utterance data 112. As described previously herein, the inadvertent release of an individual's private data by an entity charged with securing the curated information may carry a high cost in terms of both the entity's reputation and the potentially large capital costs (e.g., fines, litigation, etc.) associated with a data breach. Unfortunately, common data privacy solutions such as regex pattern matching, ad-hoc filters, and anonymization strategies are provably non-private, because these approaches cannot anticipate, and do not account for, the potential side knowledge an attacker can use in conjunction with a released dataset. One privacy definition that takes into account the limitations of existing approaches by preventing data reconstruction and protecting against any potential side knowledge is differential privacy.

To address the limitations of conventional data privacy solutions, in some embodiments, the redaction module 110 may generate the redacted utterance data 112 using a differential privacy-compliant redaction algorithm featuring MadLib-style replacements. Therefore, as illustrated by the schematic line 111 separating the redaction module 110 and the redacted utterance data 112, processes upstream of line 111 adhere to stringent requirements for privacy and security of the utterance data 108, while processes downstream of the line 111 may apply relatively more relaxed requirements due to the replacement of word and/or phrases with a high probability of being sensitive in a manner that is not capable of being reversed engineered to ascertain the sensitive words or phrases, or the other inferences plausibly made using such information.

Differential privacy, which originated in the field of statistical databases, is one of the foremost standards for defining and dealing with privacy and disclosure prevention. At a high level, a randomized algorithm is differentially private if its output distribution is similar when the algorithm runs on two adjacent inputs that differ only for a single individual. The notion of similarity may be bound by a parameter c that defines the strength of the privacy guarantee. While differential privacy has been applied successfully to a limited set of domains including statistics, data mining, geolocation, social networks, and deep learning, differential privacy has yet to be adapted to the context of natural language processing and the text domain due to compatibility issues.

To improve the compatibility between differential privacy and the text domain, a relaxed variant of differential privacy, referred to as metric differential privacy, has been developed. Metric differential privacy defines privacy based on the distinguishability level between two objects x and x'. The privacy parameter in this case is $\varepsilon d(x, x')$, where the function d represents a metric distance between the values of x and x'.

As evident from the privacy parameter, the smaller the value of d, controlled by c, the more similar the values of x and x'. The benefit of metric differential privacy is that it can be applied to an arbitrary domain of secrets X where there isn't a concept of adjacency like in statistical databases. As a result, natural text may be brought into the differential privacy world by applying a function $\phi$ that converts a word w to a vector v of real numbers. This process induces a metric space over words that have suitable distance properties between them—for example, similar words in context live within a smaller distance to each other. A well-known instance of this vector representation of words comes in the form of word embedding models that are increasingly popular in natural language processing and deep learning.

In some embodiments, the redaction module 110 provides an output that satisfies the formal constraints of metric differential privacy within arbitrarily desired privacy bounds. For example, the mechanism may take in a text query x and return a private query $(x_p, \hat{x}_s)$ which contains the original query with some words perturbed. The value $x_p$ may be obtained by leveraging on publicly available information to model an adversary's side knowledge. In this manner, the mechanism leaks no privacy beyond that which can already be discovered from the public domain.

In some embodiments, the redaction module 110 constructs $\hat{x}_s$ by adding noise to words in a high dimensional word embedding space with distance distributions controlled by ε. The word embedding models used may be public and constructed from openly available datasets. Consequently, the result of $\hat{x}_s$ does not reveal private information. The resulting query is one that confers plausible deniability on the author of the input query x.

In some embodiments, the redaction module 110 may generate redacted utterance data 112 using a metric differential privacy-compliant redaction algorithm. In some embodiments, the redaction module 110 may receive or generate a text transcription 114 based on the utterance 104 according to one or more embodiments. As depicted in FIG. 1, for example, the text transcription 114 may state, "My password is four three three two."

In some embodiments, the redaction module 110 may split the text transcription 114 into a public portion 116 and a private portion 118. The public portion 116 may include, for example, a sub string of the text transcription 114 that exists separately in a public domain (e.g., in a public database, in the general lexicography). Conversely, the private portion 118 may include, for example, a sub string of the text transcription 114 that does not appear in the public domain. In some embodiments, the redaction module 110 may search or otherwise access one or more public domains (e.g., a database, a dictionary, a library) for the longest sub string in the text transcription 114 that appears in the public domain. In some embodiments, the longest sub string may be defined as the public portion 116, while the remaining substring may be defined as the private portion 118. As depicted in FIG. 1, for example, the public portion 116 may state, "My password is," while the private portion 118 may state, "four three three two."

In some embodiments, the redaction module 110 determines a MadLib-style replacement 120 (redaction) for one or more elements in the private portion 118. In some embodiments, this MadLib-style replacement 120 may be selected from a same context or category of the private portion 118. For example, a flavor such as "sour" may be replaced by another flavor such as "sweet." In another example, a number such as "twelve" may be replaced by another number such as "three." In some embodiments, the MadLib-style replacement 120 may be randomly selected from a list of candidates having a same context or category of the private portion 118.

In some embodiments, the redaction module 110 determines a new text transcription 122 that combines the public portion 116 of the text transcription 114 with the MadLib-style replacement 120. As depicted in FIG. 1, for example, the new text transcription 122 may state, "My password is one four nine eight."

In some embodiments, the redaction module 110 generates the redacted utterance data 112 based on the new text transcription 122. In some embodiments, the redacted utterance data 112 may include the new text transcription 122 as well as metadata associated with the new text transcription 122, such as, for example, a timestamp, a date, a user account identification, a user identification, and/or an utterance type, although other metadata are within the contemplated scope of the disclosure.

Continuing with the example depicted in FIG. 1, the MadLib-style replacement 120 may be randomly generated based on a set of candidates sharing a similar context. For example, numbers in a password may be swapped with different numbers to generate a placeholder password. Advantageously, while it is clear that the new text transcription 122 concerns the identification of a password, the password itself has been protected. In this manner, the redacted utterance data 112 may include a privacy and intent-preserving redaction based on the utterance 104.

In some embodiments, the redacted utterance data 112 may be provided to a redaction delivery module 124. The redaction delivery module 124 may include any suitable computing device capable of receiving and/or generating data including, but not limited to, a remote server or servers; a desktop computer; a laptop computer; a workstation, a cloud-based computing environment, resource, platform, or service, a distributed system, or the like. In some embodiments, the redaction delivery module 124 may receive the redacted utterance data 112 from the redaction module 110 over one or more communication networks. In some embodiments, the redaction delivery module 124 may receive the redacted utterance data 112 from the redaction module 110 in response to the redaction module 110 generating the new text transcription 122.

In some embodiments, the redaction delivery module 124 may store the redacted utterance data 112 to ensure downstream availability. For example, the redacted utterance data 112 may be stored within the redaction delivery module 124 or within a local or remote database accessible by the redaction delivery module 124. In some embodiments, the redaction delivery module 124 provides the redacted utterance data 112 to one or more downstream processes or systems for additional processing (e.g., data analytics). Because the redacted utterance data 112 includes a privacy and intent-preserving redaction of an original utterance 104, these downstream processes or systems may be provided access to the redacted utterance data 112 without triggering additional privacy concerns. In other words, the redacted utterance data 112 has been cleaned and may available for low security systems or public-facing analytics (e.g., the redacted utterance data 112 may be freely published without privacy concerns).

Selecting a Differential Privacy Variant

Consider a natural language sentence x produced by a user interacting with an information system. For example, x might represent a search query, a voice command issued to a virtual assistant, part of a dialogue with an AI agent, etc. In particular, x will contain semantic information about the intent the user is trying to convey, but it might also contain private information like passwords, shipping addresses, phone numbers, and other types of personally identifiable information. It is desirable to produce a redacted version $\hat{x}$ of x that preserves the original intent while removing any private information.

At a high level, proposed is a mechanism that proceeds as follows:

(1) Split x into a public part $x_p$ and a secret part $x_s$. In some embodiments, this split can be obtained by comparing x with a publicly available database of sentences and taking $x_p$ to be that the longest substring of x present in the public database. In this manner, taking $x_s$ to be the remaining of the sentence will capture any potentially private information pertaining only to the individual who produced x, since such information would not be found in a public database.

(2) Apply a differentially private redaction mechanism M to obtain a replacement $\hat{x}_s = M(x_s)$ for the secret part of x. In some embodiments, such a replacement is sampled from a carefully crafted probability distribution to ensure that $x_s$ conveys a similar semantic meaning to $x_s$ while at the same time hiding any information that might reveal the identity of the speaker of x. Intuitively, the randomness introduced by the differentially private redaction mechanism M provides plausible deniability with respect to the nature of the original content submitted by the user.

To illustrate the functionality of the differentially private redaction mechanism M, consider the following examples:

(1) A user submits the command x="I want to order alcohol-free beer." In this case, the system (e.g., the redaction module 110 depicted in FIG. 1) might decide that $x_p$="I want to order" can be regarded as public information, while $x_s$="alcohol-free beer" may correspond to the private part of the command. The system may then redact $x_s$ by replacing $x_s$ with an intent-preserving MadLib-style replacement, such as "dairy-free beer." Here, the intent or context of the request for a particular type of beverage is preserved. By replacing the secret part $x_s$ with the intent-preserving MadLib-style replacement "dairy-free beer," however, the system may provide the user with a certain level of plausible deniability as to the exact nature of the beverage requested, in part because such a sentence could have also originated by applying the same redaction mechanism M to the command x'="I want to order dairy-free milk." In other words, it is not possible to ascertain which original command was used to generate the MadLib-style replacement.

(2) A user submits the command x="My PIN number is 4223." In this case, the system (e.g., the redaction module 110 depicted in FIG. 1) might decide that $x_p$="My PIN number is" can be regarded as public information, while $x_s$="4223" may correspond to the private part of the command. The system may then redact $x_s$ by replacing $x_s$ with an intent-preserving MadLib-style replacement, such as an alternative PIN stand-in.

(3) A user submits the command x="Please ship my product to my home at 100 Main Street, Anytown, USA." In this case, the system (e.g., the redaction module 110 depicted in FIG. 1) might decide that $x_p$="Please ship my product to" can be regarded as public information, while $x_s$="my home at 100 Main Street, Anytown, USA" may correspond to the private part of the command. The system may then redact $x_s$ by replacing $x_s$ with an intent-preserving MadLib-style replacement (e.g., an alternative address), such as "433 Second Street, Newtown, USA."

Several variants of differential privacy have been proposed in the literature to address a variety of settings depending on whether, for example, privacy is defined with respect to aggregate statistics and machine learning models (referred to as curator differential privacy), or with respect to the data points contributed by each individual (referred to as local differential privacy). The differentially private redaction mechanism M must satisfy the constraints inherent in the privatizing of individual utterances.

Since one illustrative application involves privatizing individual utterances provided by each user, local differential privacy may be the ideal privacy model to consider. However, local differential privacy exhibits a fundamental trait that may render it impractical for the illustrative application: it may require that the secret utterance $x_s$ has a non-negligible probability of being transformed into any other utterance $\hat{x}_s$, no matter how unrelated $x_s$ and $\hat{x}_s$ are. Unfortunately, this constraint makes it virtually impossible to enforce that the semantics of $x_s$ are approximately captured by the privatize utterance $\hat{x}_s$ since the space of utterances is exponentially large and the number of utterances semantically related to $x_s$ will have vanishingly small probability under local differential privacy.

To address this limitation, instead of local differential privacy, the differentially private redaction mechanism M may be based on a relaxation of local differential privacy referred to as metric differential privacy. Metric differential privacy was originally developed as an abstraction of the local differential privacy model to address the privacy-utility trade-off in location privacy. In particular, metric differential privacy provides a mechanism to report a user's location in a privacy-preserving way while giving higher probability to locations which are actually close to the current location and negligible probability to locations in a completely different part of the planet.

Formally speaking, metric differential privacy is defined for mechanisms whose inputs come from a set X equipped with a distance function $d: X \times X \to R_+$ satisfying the axioms of a metric (i.e. identity of indiscernibles, symmetry, and the triangle inequality). The definition of metric differential privacy depends on the particular distance function d being used and it is parametrized by a privacy parameter $\varepsilon > 0$. A randomized mechanism $M: X \to Y$ satisfies $\varepsilon$ if for any x, $x' \in X$ the distributions over outputs of $M(x)$ and $M(x')$ satisfy the following bound: for all $y \in Y$ the result may be:

$$\frac{Pr[M(x) = y]}{Pr[M(x') = y]} \leq e^{\varepsilon d(x, x')} \quad (1)$$

Note that for an uncountable output space Y the above probabilities may be interpreted as densities.

The type of probabilistic guarantee described by (1) is characteristic of differential privacy: it says that the log-likelihood ratio of observing any particular output y given two possible inputs x and x' is bounded by $\varepsilon d(x, x')$. The key difference between metric differential privacy and local differential privacy is that the latter corresponds to a particular instance of the former when the distance function is given by $d(x, x')=1$ for every x, x. Note this metric does not provide a way to classify some pairs of points in X as being closer than others. This indicates that local differential privacy implies a strong notion of indistinguishability of the input, thus providing very strong privacy by "remembering" very little about the input. In contrast, metric differential privacy may be less restrictive and allows the indistinguishability of the output distributions to be scaled by the distance between the respective inputs. In particular, the further away a pair of inputs are, the more distinguishable the output distributions can be, thus allowing these distributions to remember more about their inputs than under the strictly stronger definition of local differential privacy.

Mechanism Details

In some embodiments, the metric differentially private mechanism M may take as input a string x containing |x| words and outputs a string $\hat{x}_s$ of the same length. As explained previously herein, the first step may include splitting x into a public part $x_p$ and a secret part $x_s$. For notational simplicity it may be written $x=(x_p, x_s)$, but note that in principle the words in $x_p$ and $x_s$ may be interleaved in any way.

In some embodiments, the metric differentially private redaction mechanism M may preserve an underlying interleaving structure. In other words, the interleaving pattern may be part of the public part $x_p$ of x. With this notation, the redaction mechanism M can be written as $R(x)=(x_p, \hat{x}_s)$, where the public part $x_p$ of x (including the interleaving pattern between the secret and the public parts) is not modified, while $\hat{x}_s$ is sampled from a distribution over string of length $\ell = |x_s|$.

To privatize the secret part $x_s$ of x a metric differentially private mechanism $M: X \to X$, where $X = W\ell$ is the space of all strings of length $\ell$ with words in a public dictionary W, may be utilized. The metric between strings may be derived from a word embedding procedure $\phi: W \to \mathbb{R}^d$ as follows: given x, x'∈W$\ell$ for some $\ell \geq 1$, then:

$$d(x, x') = \sum_{i=1}^{\ell} \|\phi(w_i) - \phi(w_i')\| \quad (2)$$

where $w_i$ denotes the i-th word of x, $w_i'$ denotes the i-th word of x', and $\|\cdot\|$ denotes the Euclidean norm on $\mathbb{R}^d$. Note that d satisfies all the axioms of a metric as long as the word embedding $\phi$ is injective (e.g., one-to-one). In some embodiments, the word embedding $\phi$ is independent of the data to be privatized. For example, a publicly available word embedding like GloVe or a new word embedding trained on a publicly available dataset or a dataset containing no private information may be used.

In some embodiments, the mechanism M works by computing the embedding $\phi(w)$ of each word $w \in x_s$ in the secret part of x, adding some properly calibrated noise N to obtain a perturbed embedding $\phi' = \phi(w) + N$, and then replacing the word w with the word $\hat{w}$ whose embedding is closer to $\phi'$. The noise N may be sampled for a d-dimensional distribution with density given by $P_N(z) \propto \exp(-\varepsilon\|z\|)$, where c is the privacy parameter of the mechanism M.

In some embodiments, the mechanism M may be provided by the following pseudo-code:

(1) Input a secret string $x_s = w_1 w_2 \ldots w\ell$ and a privacy parameter $\varepsilon > 0$
(2) For i∈{1, . . . , $\ell$} do:
   (a) Compute the embedding $\phi_i = \phi(w_i)$.
   (b) Perturb the embedding to obtain $\hat{\phi}_i = \phi_i + N$ with a noise density[3] $P_N(z) \propto \exp(-\varepsilon\|z\|)$.
   (c) Obtain the perturbed word $\hat{w}_i = \mathrm{argmin}_{\tilde{w} \in W} \|\phi(\tilde{w}) - \hat{\phi}_i\|$.
   (d) Add $\hat{w}_i$ in the i-th position of $\hat{x}_s$.
(3) Release $\hat{x}_s$ Stated differently, a privacy parameter may be selected that induces a distance d within a metric space of word embeddings (see, for example, Equation 2). Next, within that distance d, there is a set of "candidate" words, the word embedding space as determined by a word embedding model. The stronger the privacy, the larger the distance d, that is, a current word may be swapped with more available candidate words. In selecting a candidate word to replace the private word, the private word is located within the embedding (see step, for example, 2.(a)). Next, a multivariate Laplace noise that may be sampled for d-dimensional distribution is added to the word embedding to generate a perturbed word embedding from which a random point (or location) close to the private word may be selected (see, for example, step 2.(b)). Then a new word closest (that is, closer to the point (or location) than alternative words in the perturbed embedded space) to this new random point may be selected as the candidate, that is, the replacement word (see, for example, step 2.(c)). Accordingly, the candidate word is within distance d of the private word so as to maintain sentiment.

The following result proves that the mechanism M satisfies $\varepsilon$ with respect to the metric d defined above. Observe that M can be viewed as a combination of the generic exponential mechanism construction for the metric d together with a post-processing strategy that does not affect the privacy guarantee of the exponential mechanism.

Theorem and Illustrative Proof

Beginning with the theorem, for any $\ell \geq 1$ and any $\varepsilon > 0$, the mechanism $M: W\ell \to W\ell$ satisfies $\varepsilon$-metric differential privacy with respect to d.

Next, as proof, first consider the case $\ell = 1$ so that $x = w \in W$ and $x' = w' \in W$ are two inputs of length one. For any possible output word $\hat{w} \in W$ define a set $C_{\hat{w}} \subset \mathbb{R}^d$ containing all the feature vectors which are closer to the embedding $\phi(\hat{w})$ than to the embedding of any other word. Formally, this may result in:

$$C_{\hat{w}} = \{z \in \mathbb{R}^d : \|z - \phi(\hat{w})\| < \min_{\tilde{w} \in W \setminus \{\hat{w}\}} \|z - \phi(\tilde{w})\|\} \quad (3)$$

The reason for introducing the set $C_{\tilde{w}}$ is because it is directly related to the probability that the mechanism M on input x=w produces $\hat{w}$ as output. Indeed, by the description of M the result of $M(w) = \hat{w}$ may occur if and only if the perturbed feature vector $\hat{\phi} = \phi(w) + N$ is closer to $\phi(\hat{w})$ than to the embedding of any other word in W. In particular, letting $P\phi(w) + N(z)$ denote the density of the random variable $\phi(w) + N$, the probability of this event may be written as follows:

$$Pr[M(w) = \hat{w}] = Pr[\phi(w) + N \in C_{\hat{w}}] = \int_{C_{\hat{w}}} P\phi(w) + N^{(z)} dz = \quad (4)$$

$$\int_{C_{\hat{w}}} PN(z - \phi(w)) dz \propto \int_{C_{\hat{w}}} \exp(-\varepsilon\|z - \phi(w)\|) dz$$

where that the use of $\phi(w) + N$ has exactly the same distribution of N but with a different mean. Note that the triangle inequality for the norm $\|\cdot\|$ implies that for any $z \in \mathbb{R}^d$ the following inequality may result:

$$\exp(-\varepsilon\|z - \phi(w)\|) = \frac{\exp(-\varepsilon\|z - \phi(w)\|)}{\exp(-\varepsilon\|z - \phi(w')\|)} \exp(-\varepsilon\|z - \phi(w')\|) \quad (5)$$

$$= \exp(\varepsilon(\|z - \phi(w')\| - \|z - \phi(w)\|))$$

$$\exp(-\varepsilon\|z - \phi(w')\|)$$

$$\leq \exp(\varepsilon\|\phi(w) - \phi(w')\|) \exp(-\varepsilon\|z - \phi(w')\|)$$

$$= \exp(\varepsilon d(w, w'))(\exp - \varepsilon\|z - \phi(w')\|)$$

Thus, by plugging the last two derivations together and observing that the normalization constant in $P_N(z)$ and $P_\phi(w) + N(z)$ is the same, the following may be obtained:

$$\frac{Pr[M(w) = \hat{w}]}{Pr[M(w') = \hat{w}]} = \frac{\int_{C_{\hat{w}}} \exp(-\varepsilon\|z - \phi(w)\|) dz}{\int_{C_{\hat{w}}} \exp(-\varepsilon\|z - \phi(w')\|) dz} \leq \exp(\varepsilon d(w, w')) \quad (6)$$

Thus, for $\ell = 1$ the mechanism M satisfies $\varepsilon$-metric differential privacy (referred to as $\varepsilon$-mDP).

Next consider the general case ℓ >1. Observe that because the mechanism M treats each word in x=$w_i$ ... $w_\ell$ independently, the result follows directly from the analysis for the case ℓ =1. To see this, note the following decomposition allows the output distribution of the mechanism on strings of length ℓ >1 to be written in terms of the output distributions of the mechanism on strings of length one: for x, ∈Wℓ a result is:

$$Pr[M(x) = \hat{x}] = Pr[M(w_1 \ldots w_\ell) = \hat{w}_1 \ldots \hat{w}_\ell] = \prod_{i=1}^{\ell} Pr[M(w_i) = \hat{w}_i] \quad (7)$$

Therefore, using that M is ε-mDP with respect to d on strings of length one, for any pair of inputs x, x'∈Wℓ and any output $\hat{x}$∈Wℓ the following may be satisfied:

$$\frac{Pr[M(x) = \hat{x}]}{Pr[M(x') = \hat{x}]} = \prod_{i=1}^{\ell} \left( \frac{Pr[M(w_i) = \hat{w}_i]}{Pr[M(w'_i) = \hat{w}_i]} \right) \quad (8)$$

$$\leq \prod_{i=1}^{\ell} \exp(\varepsilon d(w_i, w'_i)) = \exp(\varepsilon d(x, x'))$$

where the definition of d may be equivalent to $$d(x, x') = \sum_{i=1}^{\ell} d(wi, w'i).$$

Selecting a Public Substring

As discussed previously herein, in some embodiments, the first step of the mechanism M may require splitting an utterance x into a public part $x_p$ and a secret part $x_s$. In some embodiments, the public part $x_p$ is determined by building a differentially private exploration tree of variable length n-grams.

In some embodiments, the differentially private exploration tree is build using a public dataset D containing a list of queries Q. In this context, a "public" dataset may include a publicly-available dataset as well as a dataset that is widely available within an organization, but that is not shared externally. Let W={$W_1$, $W_2$, ..., $W_{|W|}$} be the universe (vocabulary) of words in the dataset. Each query Q may be a sequence of ordered words drawn from the universe W. Every query Q of length |Q| may include an ordered list of words Q=$W_1 \rightarrow W_2 \rightarrow \ldots \rightarrow W_{|Q|}$. The words in Q can be interleaved in any way as long as ∀$W_i$∈Q, $W_i$∈W. Dataset D={$Q_1$, $Q_2$, ..., $Q_{|D|}$} is therefore a multiset of queries of varying lengths.

In some embodiments, an ordered tree data structure may be created such that every node represents a word in W. Each node may be associated with a query Q defined by the sequential walk from the root of the tree to that node. In some embodiments, the value of each node may be a count of the number of times Q occurs in D.

In some embodiments, each query Q in D may be added to the root of the tree where it propagates to create or update existing nodes. Rather than record the true value of the query counts, in some embodiments, Laplacian noise may be added to the count of each query Q. The noise may be a random variable: Lap(x|b)=1/(2b) exp(−|x|/(2b)), drawn from the Laplace distribution centered at mean 0 with a scale parameter b=1/ε.

Therefore, in some embodiments, every node and leaf of the tree may contain the noisy count of the original query Q that terminates at that node or leaf. This prevents membership inference attacks—a process whereby an adversary determines if a given record was part of a training set. In some embodiments, the tree may be pruned for each node with count less than a k parameter. The amount of noise added to the count of each query Q may be inversely proportional to the privacy parameter ε. In other words, high noise may be added to phrases that are extremely rare, and conversely, low or no noise may be added to common phrases. The k parameter used in constructing the tree may be linked to the privacy parameter ε by k=(1−ln(2δ)/ε), where δ=½ exp((1−k)/b) and b=1/ε. In some embodiments, the δ parameter comes from the cumulative distribution function Pr(x≤k) of the Laplace distribution and may represent the probability of selecting a query Q from the tree whose count is less than the k parameter.

An exemplary exploration tree constructed in this manner may be depicted as:

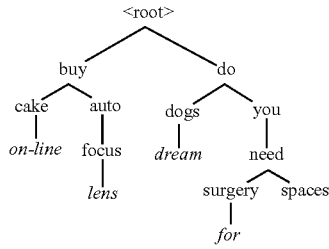

In some embodiments, the exploration tree may be searched to select a public prefix $x_p$ for x. In some embodiments, candidate n-grams are generated from x. The candidate n-grams may be determined from substrings of length n=|x| starting from index positions 0 to n−1. In some embodiments, the n strings may be matched against the exploration tree and the longest prefix, with the highest frequency count, may be selected as $x_p$. The selected substring $x_p$ represents the portion of x with the highest transition probabilities with respect to the tree. Notice that the n-gram substring can occur multiple times in dataset D. Each node n traversed in selecting $x_p$ represents a conditional probability of transitioning from node n's parent to n. Advantageously, releasing $x_p$ does not result in a privacy breach given an assumption that it was constructed from publicly available data, as discussed previously herein.

Clustering and Laplacian Noise

As discussed previously herein, the mechanism M may be used to construct $\hat{x}_s$ by adding noise to words in a high dimensional word embedding space with distance distributions controlled by ε. In some embodiments, Laplacian noise may be injected into a count-based feature that gives rise to sentences. Given a sentence that may be represented as public and private parts $x_p$ and $x_s$. In some embodiments, mechanism M' may be used to permute private parts yielding higher intent-preserving properties, but informal privacy-preserving properties. In some embodiments, a word w in $x_s$ having a low probability may be swapped with one of its k-nearest neighbors by uniformly sampling from the k neighbors, according to:

$$k \approx \frac{|C_{max}|}{|C_w|} * (1 + \mathcal{L}(0, \beta)) \quad (9)$$

where L is the Laplace distribution, and $|c_{max}|$ and $|c_w|$ are the sizes of the largest cluster and cluster associated with w, respectively. Observe that the equation (1) shows how noise may be added inversely proportional to the "semantic density" ($c_w$) of w. In rather learning a global metric distance d per embedding representation (e.g., GloVe) in M' k may be estimated per cluster $c_w$ in M'. M' may be adopted when trading-off for intent-preservation over privacy-preservation with respect to ε. The parameter analogous to ε in M' is the threshold t∈(0.,1.) used in Chinese Whispers.

In some embodiments, the k-nearest neighbors may define a cluster having a shared semantic context. In some embodiments, the cluster may be defined using word-level clustering and/or sentence-level clustering.

Word-level clustering defines the probabilistic, semantic context of words, given a domain. For example, the words "sour," "sweet," and "salty" may form a first word-level cluster that shares a same context (e.g., "flavors" or "tastes"). Embeddings may be built on the premise that a set of words that share common contexts can be mapped to a proximal set of vectors in metric space. By clustering embeddings at the word-level, the mechanism M may create or determine a set of candidates that may be used for the private portion of an utterance.

In some embodiments, richer clusters $\pi_w^- \in \Pi_D$ may be derived from sentence embeddings. So-called sentence-level clustering provides additional labels for determining one or more candidates. For example, the phrase "buy apples," "buy bread," and "buy milk" may all be related to a particular sentence-level cluster (e.g., "groceries" or "shopping").

In some embodiments, the mechanism M' fits discovered classes continuously as the dataset grows. By adopting this approach rather than fixing the number of classes a priori, the mechanism M can potentially discover unbounded, unknown classes of sensitive information. This is possible using Bayesian nonparametrics (BNP).

In some embodiments, new "anonymous" classes only become meaningful with attributed (e.g., labeled) metadata. In some embodiments, the mechanism M' relies in part upon a human-in-the-loop based machine-learning model to classify (label) clusters. Nonparametric models allow for new clusters to be continually fit as new "unseen species" arise in the utterance data. By assuming that the utterance data arises from a stochastic process prior $$G = \sum_{k=1}^{inf} B_k \delta_{\theta k},$$

new data labels may be discovered from the infinite atom locations $\delta_\theta$ with non-zero probability B.

In some embodiments, the mechanism M' adopts a parameterized implementation of the Chinese Whispers algorithm to constrain the shape and size of the clusters. In this manner, the mechanism M' may ensure that every member within a cluster is within a finite distance from the centroid of the cluster. Empirical evidence suggests (e.g., see FIG. 2 and the associated discussion) that the distribution of clusters possesses desired power law properties.

Privacy Semantics

Observe that two properties guaranteed by differential privacy extend to the variant of metric differential privacy described and leveraged herein according to one or more embodiments: (i) regardless of an adversary's side knowledge, the knowledge gained by observing a query from a metric differential privacy-based mechanism is the same whether or not the query was originally in D; and (ii) an informed adversary who has full access to the public dataset D gains no extra knowledge by observing the released query from a metric differential privacy-based mechanism. These properties are a result of the specific construction of the metric differentially private mechanism M described herein, according to the proof described previously.

In some embodiments, an adversary's side knowledge may be characterized as a prior distribution π, while every query $R(x)=(x_p, \hat{x}_s)$ released from the mechanism induces a posterior distribution $\hat{\sigma}$ on the adversary's knowledge. The prior can be described over dataset D which contains public information identified by $x_p$ from the input query x. The posterior may be updated when $\hat{x}_s$ is revealed. The mechanism M guarantees that posteriors $\hat{\sigma}$ and σ (computed over the real secret $x_s$) will be very similar. Observe that M does not guarantee, and need not guarantee, that the adversary gains no additional knowledge—of course, as long as $|x_s|>0$, there will always be additional information inferred over that from merely observing $x_p$. However, M guarantees that the additional information over the posteriors $\hat{\sigma}$ and σ are similar while affording plausible deniability on the contents of $x_s$.

For a given metric $dx:X^2 \to [0,\infty]$ such that $d(x, x)=0$, $d(x, x')=d(x', x)$ and $d(x_1, x_2) \leq d(x_1, x_3)+d(x_2, x_3)$, now discuss how to think about the privacy provided by the redaction mechanism M. Note that d is parametrized by the privacy parameter ε>0. In other words, (i) as the $\lim_{\varepsilon \to 0} d(x, x') \to \infty$, privacy gets better by expanding the number of points in the hyperspace for selecting values of $\hat{x}_s$; and conversely, (ii) as $\lim_{\varepsilon \to \infty} d(x, x') \to 0$, privacy reduces by shrinking the space available for perturbing words in $x_s$. For downstream tasks using this mechanism, (i) results in less utility at the expense of privacy gains.

Intuition 1. One can view the privacy preservation of M by considering $x_s$ as a single word representing a single point $\phi(w_i)$ in the metric space defined by the embedding model. $D(w_i, w'_i)$ may be expressed as the Euclidean distance between $\phi(w_i)$ and $\phi(w'_i)$, as discussed previously herein. With the mechanism M, an adversary will assign similar probabilities to $x_s$ and $\hat{x}_s$ after observing the output $R(x)=(x_p, \hat{x}_s)$.

Intuition 2. The mechanism M ensures that the probability of the sets of points within the hypersphere defined by $d(w_i, w'_i)$, before observing the output $R(x)=(x_p, \hat{x}_s)$ are similar. Therefore, the entropy associated with observing $x_s$ and $\hat{x}_s$ will be similar and not skewed by the output of the mechanism M.

Intuition 3. Given the possible secret outputs $x_s$ and $\hat{x}_s$, the mechanism M guarantees that R(x) could have been generated from either point or indeed any points within the distance $d(w_i, w'_i)$. Therefore, observing R(x) does not reveal whether the actual secret is $x_s$, $\hat{x}_s$, or any other point within the distance $d(w_i, w'_i)$.

To provide privacy and intent-preserving redactions, an example process flow 150 is presented and may be performed, for example, by the utterance detection module 106, the redaction module 110, and/or the redaction delivery module 124. In some embodiments, the utterance detection module 106, the redaction module 110, and/or the redaction delivery module 124 may each include at least one memory that stores computer-executable instructions and at least one processor configured to access the at least one memory and execute the computer-executable instructions to perform various actions or operations, such as one or more of the operations in the process flow 150 of FIG. 1.

At a first block 152, a user device (e.g., a smart home device, such as the utterance detection module 106 depicted in FIG. 1) may receive utterance data from one or more users. The utterance data may include, for example, a question, a statement, a search query, a voice command, a dialog or conversation, or any other spoken expression. For example, the utterance data may include the phrase, "My password is four three three two," as depicted in FIG. 1.

At block 154, the utterance data may be split or otherwise partitioned into a public portion and a private portion according to one or more embodiments. In some embodiments, the public portion may be identified by searching a differentially private exploration tree of variable length n-grams.

In some embodiments, the differentially private exploration tree may be created such that every node represents a word and each node may be associated with a query defined by the sequential walk from the root of the tree to that node. In some embodiments, the value of each node may be a count of the number of times a query occurs. In some embodiments, every node and leaf of the exploration tree may contain the noisy count of the original query that terminates at that node or leaf, as discussed previously herein.

In some embodiments, the exploration tree may be searched to select the public portion of the utterance data according to one or more embodiments. In some embodiments, one or more strings may be matched against the exploration tree and the string having the longest prefix, with the highest frequency count, may be selected as the public part.

At block 156, the private portion (e.g., that remaining portion which was not included within the public portion) may be modified using a MadLib-style substitution according to one or more embodiments. In some embodiments, the utterance detection module 106, the redaction module 110, and/or the redaction delivery module 124 depicted in FIG. 1 may be configured to generate the resulting redacted utterance data.

In some embodiments, the private portion may be modified using a metric differentially private mechanism to obtain a replacement that preserves the privacy of the source of the utterance data. In some embodiments, the replacement may be selected to ensure that the replacement conveys a similar semantic to the private portion it replaced.

In some embodiments, the metric differentially private mechanism may take as input a string x containing |x| words and outputs a string 2 of the same length. In some embodiments, the metric differentially private redaction mechanism may preserve an underlying interleaving structure. In other words, it is not necessary that the public portion be wholly separated from the private portion. For example, the phrase "My name is Pat, I love fruit, and I live at 100 Main Street," may include a public portion, "My name is, I love fruit, and I live at" and a private portion, "Pat 100 Main Street."

In some embodiments, the mechanism works by computing an embedding $\phi(w)$ of each word w within the private portion, adding noise N to obtain a perturbed embedding $\phi'=\phi(w)+N$, and then replacing the word w with a word $\hat{w}$ whose embedding is closer to $\phi'$, as described previously herein.

At block 158, the redacted utterance data may be transmitted to or received by a redaction delivery module (e.g., the redaction delivery module 124 depicted in FIG. 1). In some embodiments, the redacted utterance data are locally stored on a memory device a redaction module (e.g., the redaction module 110 depicted in FIG. 1). In some embodiments, the redacted utterance data may be provided to one or more downstream systems or processes for additional processing. Advantageously, the redacted utterance data has been scrubbed of personally identifiable information with certain probabilistic privacy guarantees as described previously herein, and may consequently be used by downstream systems and processes that may not satisfy stringent data protection regulations.

Example embodiments of the disclosure provide a number of technical features or technical effects. For example, in accordance with example embodiments of the disclosure, certain embodiments of the disclosure may provide a mechanism for generating privacy and intent preserving redactions of text derived from utterance data. In some embodiments, an utterance may be converted into a string of utterance data using, for example, a speech-to-text conversion model. In some embodiments, the string of utterance data may be split into public and private portions using, for example, an exploration tree. The public portion may be identified by determining the portion of the utterance with the highest transition probabilities with respect to the tree. In some embodiments, the private portion may be substituted in a MadLib-style using a metric differentially private mechanism M. Advantageously, the mechanism may be constructed to preserve privacy with certain, arbitrarily definable probabilistic guarantees.

Embodiments of the disclosure may improve the quality and quantity of data available to downstream data information systems. In particular, the mechanism M provides a special, unique type of cleaned data that is differentially private within an arbitrarily set privacy threshold without sacrificing the context of the utterance upon which the mechanism has been applied. This cleaned data is of great value to many downstream systems, which due to privacy concerns, may not otherwise have access to the data. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
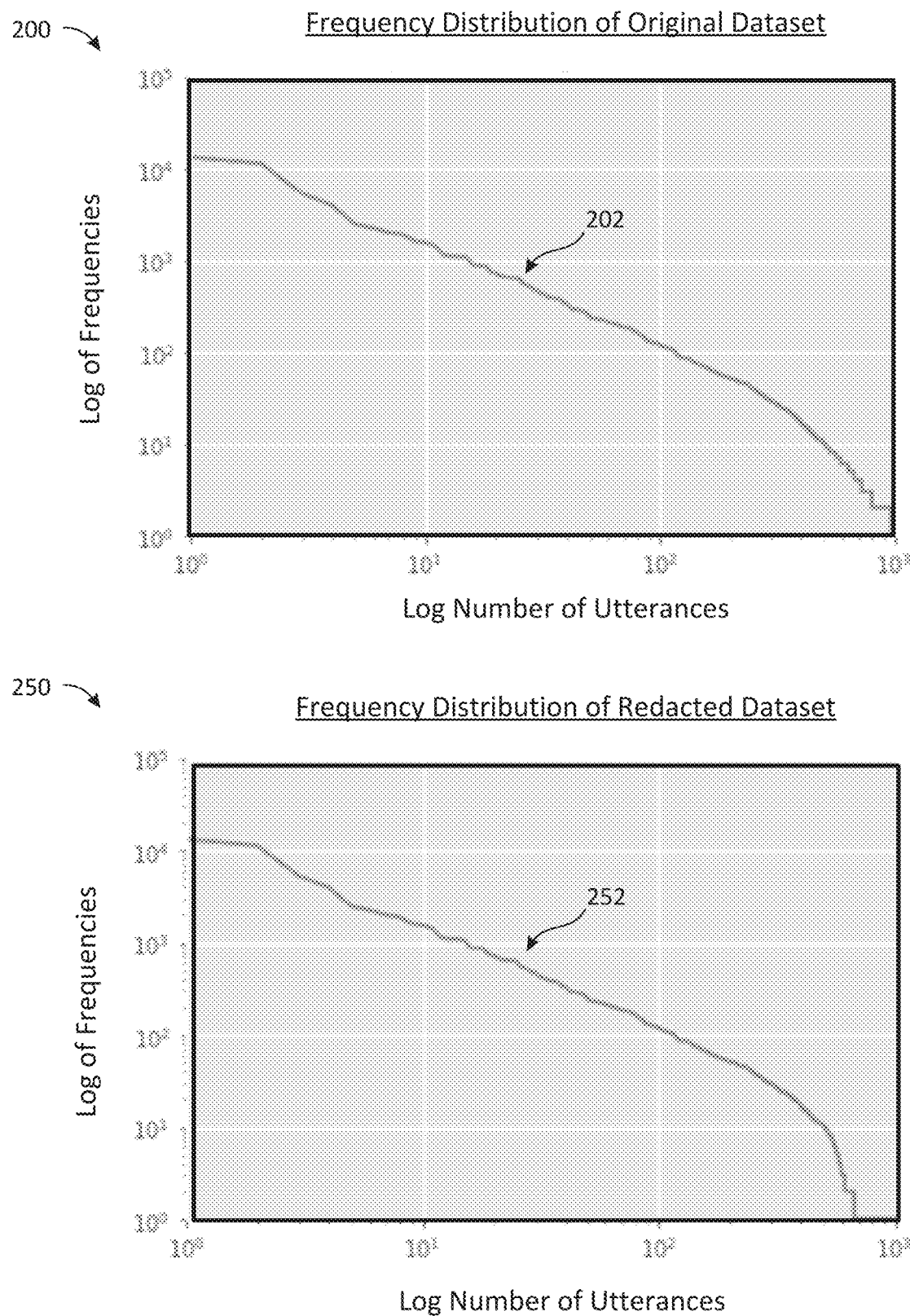
FIG. 2 is a schematic illustration of a frequency distribution of an original dataset and a frequency distribution of a redacted dataset obtained in accordance with one or more example embodiments of the disclosure.

FIG. 2 schematically illustrates an exemplary graph 200 depicting a frequency distribution of an original dataset and an exemplary graph 250 depicting a frequency distribution of a redacted dataset obtained in accordance with one or more example embodiments of the disclosure. As discussed previously herein, the differentially private redaction mechanism M' may be based on an original dataset (e.g., an original utterance) which may be partially permuted to preserve privacy and semantic context. The selection of candidates suitable for replacing a private portion of the utterance may be based on a clustering algorithm according to one or more embodiments.

In some embodiments, the mechanism M' may permute words in the utterance that are associated with a low probability (e.g., those words having a high risk of subverting a privacy requirement). In some embodiments, a word w having a low probability may be swapped with one of its k-nearest neighbors by uniformly sampling from the k neighbors. In some embodiments, the k-nearest neighbors may define a cluster having a shared semantic context.

As illustrated in FIG. 2, the graph 200 includes a first log of frequencies 202. As further illustrated in FIG. 2, the first log of frequencies 202 decreases from approximately $10^4$ when the log number of utterances is 1, to a minimum of approximately 1 when the log number of utterances is $10^3$.

As illustrated in FIG. 2, the graph 250 includes a second log of frequencies 252. As further illustrated in FIG. 2, the second log of frequencies 252 decreases from approximately $10^4$ when the log number of utterances is 1, to a minimum of approximately 1 when the log number of utterances is $5.5 \cdot 10^3$. By comparing the first log of frequencies 202 to the second log of frequencies 252, observe that the mechanism M' is able to maintain the original frequency distribution of the input (original) dataset.

In some embodiments, the graph 200 and/or the graph 250 may be leveraged to generate or validate a privacy and intent-preserving redaction according to one or more embodiments. For example, the data in the graph 200 and/or 250 may be used by the redaction module 110 depicted in FIG. 1 to validate the redacted data and/or the underlying clustering.

FIG. 2 also demonstrates Madlib's applicability to many natural language processing (NLP) applications, for instance, because Madlib's preserve the original dataset's lexicon proportional to the calibrated value of epsilon (ε). This means that for a reasoned selection of parameter ε for a given setting, the majority of the words occurring in the original dataset remain within the lexicon of the redacted dataset. FIG. 2 demonstrates the selection of ε=700, which corresponds to a distance d of 0.7, showing how only some portion of the words occurring less than 10 times are dropped. These infrequent, dropped words have no neighbors at distance less than 0.7, and therefore have no candidates for replacement, as reflected in the tail of the log of frequencies 252 (essentially dropping rare words, and causing the drop in the tail of the distribution in graph 250). An ε with a higher value may have higher privacy leakage, larger distance d, and/or larger lexicon; logically, a lower ε may have lower privacy leakage, smaller distance d, and/or a smaller lexicon.

Figure 3:
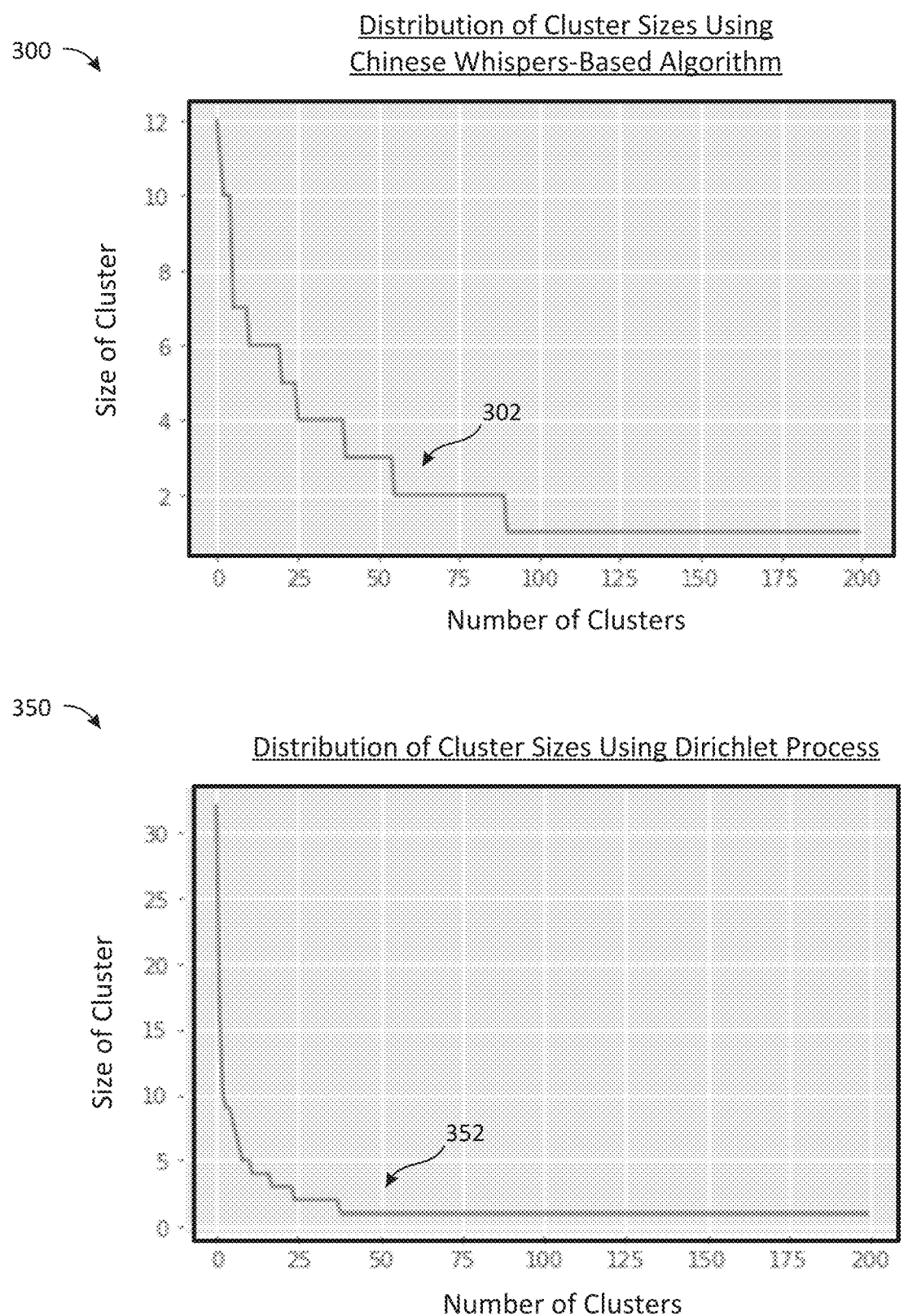
FIG. 3 is a schematic illustration of a distribution of cluster sizes using Chinese Whispers and a distribution of cluster sizes using a Dirichlet process in accordance with one or more example embodiments of the disclosure.

FIG. 3 schematically illustrates an exemplary graph 300 depicting a distribution of cluster sizes using Chinese Whispers and an exemplary graph 350 depicting a distribution of cluster sizes using a Dirichlet process in accordance with one or more example embodiments of the disclosure. As discussed previously herein, the redaction mechanism M' may be based on an original dataset (e.g., an original utterance) which may be partially permuted to preserve privacy and semantic context. The selection of candidates suitable for replacing a private portion of the utterance may be based on a clustering algorithm according to one or more embodiments.

In some embodiments, the mechanism M' adopts a parameterized implementation of the Chinese Whispers algorithm to constrain the shape and size of these clusters. In this manner, the mechanism M' may ensure that every member within a cluster is within a finite distance from the centroid of the cluster. In comparison to M, a differentially private mechanism, the size of the max cluster size (for instance, $c_{max}$) is equivalent to the distance d, and operates as an intent preserving mechanism.

As illustrated in FIG. 3, the graph 300 includes a first size of clusters 302. As further illustrated in FIG. 3, the first size of clusters 302 decreases from approximately 12 when the number of clusters is close to zero, to a minimum of approximately 1 when the number of clusters is large (e.g., over approximately 90). Observe that the distribution of clusters sizes derived using Chinese Whispers possesses desired power law properties.

As illustrated in FIG. 3, the graph 350 includes a second size of clusters 352. As further illustrated in FIG. 3, the second size of clusters 352 decreases from more than approximately 30 when the number of clusters is close to zero, to a minimum of approximately 1 when the number of clusters approaches approximately 40. Observe that the distribution of clusters sizes derived using a Dirichlet process does not possess desired power law properties. Instead, the distribution of cluster sizes increases asymptotically below approximately 10 clusters.

In some embodiments, the graph 300 and/or the graph 350 may be leveraged to generate or validate a privacy and intent-preserving redaction according to one or more embodiments. For example, the data in the graph 300 and/or 350 may be used by the redaction module 110 depicted in FIG. 1 to validate the shape or size of an underlying clustering used to identify candidates for a MadLib-style substitution according to one or more embodiments.

Figure 4:
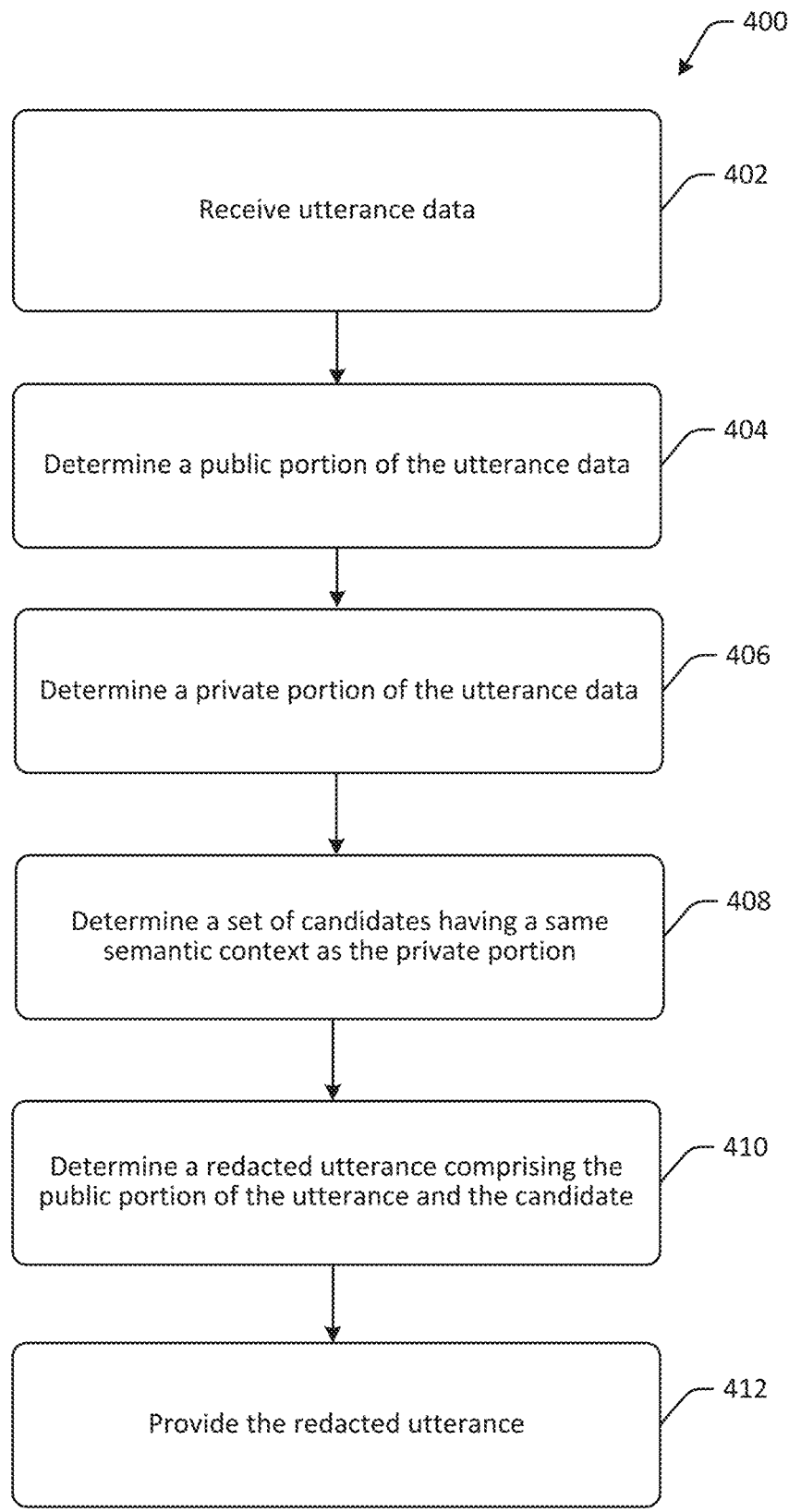
FIG. 4 is a schematic illustration of an example process flow for providing privacy and intent preserving redactions of text derived from utterance data in accordance with one or more example embodiments of the disclosure.

FIG. 4 schematically illustrates an example use case and an example process flow 400 for providing privacy and intent preserving redactions of text derived from utterance data in accordance with one or more example embodiments of the disclosure. Some or all of the blocks of the process flow 400 may be performed in a distributed manner across any number of devices. The operations of the process flow 400 may be optional and may be performed in a different order.

At block 402, utterance data may be received by an utterance detection module. In some embodiments, the utterance data comprises an utterance, such as a command, a question, or a conversation, spoken by one or more individuals. The utterance data may be received according to one or more embodiments, such as by a smart home device or the utterance detection module 106 depicted in FIG. 1.

At block 404, a public portion of the utterance data is determined. The public portion may be determined according to one or more embodiments, such as by the redaction module 110 depicted in FIG. 1. While a method for determining public data is presented, it will be appreciated that there are many, for example, extracting common sentences from Wikipedia.

In some embodiments, the public portion may be identified by searching a differentially private exploration tree of variable length n-grams. In some embodiments, the differentially private exploration tree may be created such that every node represents a word and each node may be associated with a query defined by the sequential walk from the root of the tree to that node. In some embodiments, the value of each node may be a count of the number of times a query occurs. In some embodiments, every node and leaf of the exploration tree may contain the noisy count of the original query that terminates at that node or leaf, as discussed previously herein.

In some embodiments, the exploration tree may be searched to select the public portion of the utterance data according to one or more embodiments. In some embodiments, one or more strings may be matched against the exploration tree and the string having the longest prefix, with the highest frequency count, may be selected as the public part.

In some embodiments, a candidate n-gram may be identified or otherwise determined that includes a substring having a maximum length one less than a length of the utterance. For example, if the utterance is a phrase having 10 words, the maximum length of the substring may be 9 words. In some embodiments, the candidate n-gram associated with a longest prefix and a highest frequency count of the differentially private exploration tree is selected as the public part.

At block 406, a private portion of the utterance data is determined. The private portion may be determined according to one or more embodiments, such as by the redaction module 110 depicted in FIG. 1. In some embodiments, the private portion includes the remaining portion of the utterance that was not included within the public portion.

At block 408, a set of candidates having a same semantic context as the private portion is determined. The set may be determined according to one or more embodiments, such as by the redaction module 110 depicted in FIG. 1. In this manner, a replacement for the private portion may be selected from the set to ensure that the semantic context or intent of the utterance is conserved after redaction.

In some embodiments, the private portion may be swapped with one of its k-nearest neighbors (referred to as a candidate) by uniformly sampling from the k neighbors, according to one or more embodiments. In some embodiments, the k-nearest neighbors may define a cluster having a shared semantic context. In some embodiments, k is proportional to a ratio of a largest cluster to the cluster having a same semantic context as the private portion. The cluster may be defined using word-level clustering and/or sentence-level clustering, according to one or more embodiments. In some embodiments, the private portion may be swapped with a first candidate of the k-nearest neighbors. In some embodiments, the first candidate may be randomly selected from the k-nearest neighbors.

At block 410, a redacted utterance comprising the public portion of the utterance data and the candidate is determined. The redacted utterance may be generated or otherwise determined according to one or more embodiments, such as by the redaction module 110 depicted in FIG. 1. In some embodiments, where the work or phrase does not have an alternative in the set, the word may be dropped, that is, omitted from the redacted utterance.

At block 412, the redacted utterance may be provided to one or more downstream systems or processes, according to one or more embodiments. In some embodiments, the redacted utterance may be transmitted to or received by a redaction delivery module (e.g., the redaction delivery module 124 depicted in FIG. 1). In some embodiments, the redacted utterance is locally stored on a memory device a redaction module (e.g., the redaction module 110 depicted in FIG. 1). In some embodiments, the redacted utterance may be provided to one or more downstream systems or processes for additional processing. Advantageously, the redacted utterance data has been scrubbed of personally identifiable information with certain probabilistic privacy guarantees as described previously herein, and may consequently be used by downstream systems and processes that may not satisfy stringent data protection regulations.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 5:
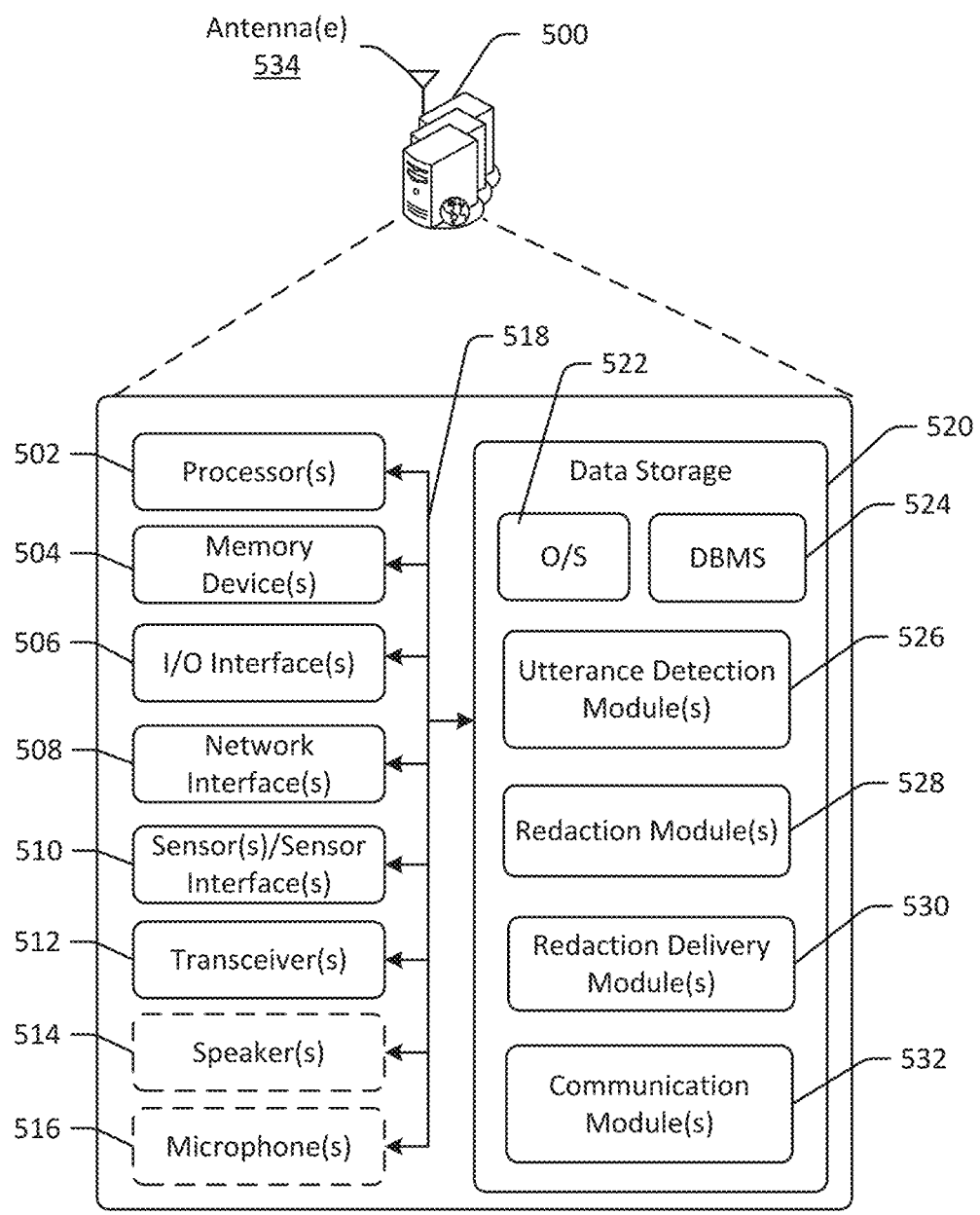
FIG. 5 is a schematic block diagram of an illustrative device in accordance with one or more example embodiments of the disclosure.

FIG. 5 is a schematic block diagram of an illustrative remote server 500 in accordance with one or more example embodiments of the disclosure. The remote server 500 may include any suitable computing device capable of receiving and/or generating data including, but not limited to, a remote server or servers; a desktop computer; a laptop computer; a workstation, a cloud-based computing environment, resource, platform, or service, a distributed system, or the like. The remote server 500 may correspond to an illustrative device configuration for the devices of FIGS. 1-4.

The remote server 500 may be configured to communicate via one or more networks with one or more servers, search engines, user devices, or the like. In some embodiments, a single remote server or single group of remote servers may be configured to perform product collection generation, product collection surfacing, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The remote server 500 may further include one or more buses 518 that functionally couple various components of the remote server 500. The remote server 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the remote server 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more utterance detection module(s) 526, one or more redaction module(s) 528, one or more redaction delivery module(s) 530, and one or more communication module(s) 532. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory device(s) 504 for execution by one or more of the processor(s) 502. Any of the components depicted as being stored in data storage 520 may support functionality described in reference to correspondingly named components earlier in this disclosure.

The data storage 520 may further store various types of data utilized by components of the remote server 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, threat intelligence data, whitelisted entity data, user account information, user profile information, machine learning models, historical accuracy data, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the utterance detection module(s) 526 may include computer-executable instructions, code, or the like, that responsive to execution by one or more of the processor(s) 502 may perform functions including, but not limited to, detecting one or more utterances issued by one or more users, according to one or more embodiments.

The redaction module(s) 528 may include computer-executable instructions, code, or the like that responsive to execution by one or more of the processor(s) 502 may perform functions including, but not limited to, splitting an utterance into a public portion and a private portion, identifying one or more candidates, and substituting the private portion with the one or more candidates, according to one or more embodiments.

The redaction delivery module(s) 530 may include computer-executable instructions, code, or the like that responsive to execution by one or more of the processor(s) 502 may perform functions including, but not limited to, receiving, storing, and/or providing redacted utterance data, according to one or more embodiments.

The communication module(s) 532 may include computer-executable instructions, code, or the like that responsive to execution by one or more of the processor(s) 502 may perform functions including, but not limited to, communicating with one or more devices, for example, via wired or wireless communication, communicating with remote servers, communicating with remote datastores, sending or receiving notifications or alerts, communicating with cache memory data, and the like.

Referring now to other illustrative components depicted as being stored in the data storage 520, the O/S 522 may be loaded from the data storage 520 into the memory 504 and may provide an interface between other application software executing on the remote server 500 and hardware resources of the remote server 500. More specifically, the O/S 522 may include a set of computer-executable instructions for managing hardware resources of the remote server 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 500 is a mobile device, the DBMS 524 may be any suitable light-weight DBMS optimized for performance on a mobile device.

Referring now to other illustrative components of the remote server 500, the input/output (I/O) interface(s) 506 may facilitate the receipt of input information by the remote server 500 from one or more I/O devices as well as the output of information from the remote server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 500 may further include one or more network interface(s) 508 via which the remote server 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna(e) 534 may include any suitable type of antenna depending, for example, on the communications protocols used to transmit or receive signals via the antenna(e) 534. Non-limiting examples of suitable antennas may include directional antennas, non-directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the remote server 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server 500 may include alternate and/or additional hardware, software, or firmware components beyond those described or depicted without departing from the scope of the disclosure. More particularly, it should be appreciated that software, firmware, or hardware components depicted as forming part of the remote server 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A method comprising:
receiving, by one or more computer processors coupled to at least one memory, an utterance from a user;

determining, by the one or more computer processors, a differentially private exploration tree comprising one or more variable length n-grams;

determining, by the one or more computer processors, a public portion of the utterance based on the differentially private exploration tree;

determining, by the one or more computer processors, a private portion of the utterance by removing the public portion from the utterance, the private portion comprising a first word;

determining, by the one or more computer processors, a set of candidates having a same semantic context as the private portion, the set of candidates comprising a first candidate, wherein the set of candidates is determined based at least in part on word-level clustering or sentencing-level clustering;

determining, by the one or more computer processors, the first candidate as a replacement for the private portion of the utterance based at least in part on a generation of a perturbed word embedding, wherein the generation of a perturbed word embedding comprises:
 determining a word embedding for the first word;
 adding noise to the word embedding to generate the perturbed word embedding; and
 determining a second word in the perturbed word embedding;

determining, by the one or more computer processors, a redacted utterance comprising the public portion of the utterance and the first candidate; and providing, by the one or more computer processors, the redacted utterance.

2. The method of claim 1, wherein determining a public portion of the utterance based on the differentially private exploration tree further comprises:
 determining, by the one or more computer processors, a candidate n-gram comprising a substring having a maximum length of one less than a length of the utterance;
 determining, by the one or more computer processors, that the candidate n-gram is associated with a longest prefix and a highest frequency count of the differentially private exploration tree; and
 selecting, by the one or more computer processors, the candidate n-gram as the public portion of the utterance.

3. The method of claim 1, further comprising determining a location in the perturbed word embedding, wherein the second word is closer to the location than alternative words in the perturbed word embedding.

4. A method comprising:
 receiving, by one or more computer processors coupled to at least one memory, utterance data;
 determining, by the one or more computer processors, a public portion of the utterance data and a private portion of the utterance data, the private portion comprising a first word;
 determining, by the one or more computer processors, a set of candidates having a same semantic context as the private portion, the set of candidates comprising a first candidate, wherein the set of candidates is determined based at least in part on word-level clustering or sentencing-level clustering;
 determining, by the one or more computer processors, the first candidate as a replacement for the private portion of the utterance data based at least in part on a generation of a perturbed word embedding, wherein the generation of a perturbed word embedding comprises:
  determining a word embedding for the first word;
  adding noise to the word embedding to generate the perturbed word embedding; and
  determining a second word in the perturbed word embedding;
 determining, by the one or more computer processors, a redacted utterance comprising the public portion of the utterance and the first candidate; and
 providing, by the one or more computer processors, the redacted utterance.

5. The method of claim 4, wherein the first candidate includes the second word.

6. The method of claim 4, further comprising determining a location in the perturbed word embedding space, wherein the second word is closer to the location than alternative words in the perturbed word embedding.

7. The method of claim 6, wherein adding noise include adding a multivariate Laplace noise.

8. The method of claim 4, further including selecting the candidate using a metric differential privacy model.

9. The method of claim 4, wherein the public portion is based on a differentially private exploration tree.

10. The method of claim 9, wherein the differentially private exploration tree comprising one or more variable length n-grams.

11. A device comprising:
 at least one memory that stores computer-executable instructions; and
 at least one processor configured to access the memory and execute the computer-executable instructions to:
  receive utterance data;
  determine a public portion of the utterance data and a private portion of the utterance data, wherein the private portion comprises a first word;
  determine a set of candidates having a same semantic context as the private portion, the set of candidates comprising a first candidate, wherein the set of candidates is determined based at least in part on word-level clustering or sentencing-level clustering;
  determine the first candidate as a replacement for the private portion of the utterance data based at least in part on a generation of a perturbed word embedding, wherein the generation of a perturbed word embedding comprises:
   determining a word embedding for the first word;
   adding noise to the word embedding to generate the perturbed word embedding; and
   determining a second word in the perturbed word embedding;
  determine a redacted utterance comprising the public portion of the utterance and the first candidate; and
  provide the redacted utterance.

12. The device of claim 11, wherein the at least one processor is further configured to:
 determine a differentially private exploration tree comprising one or more variable length n-grams; and
 determine the public portion of the utterance based on the differentially private exploration tree.

13. The device of claim 11, wherein the at least one processor is further configured to:
 determine a location in the perturbed word embedding, wherein the second word is closer to the location than alternative words in the perturbed word embedding.

14. The device of claim 11, wherein the first candidate includes the second word.

15. The device of claim 11, wherein the at least one processor is further configured to:

select the candidate using metric differential privacy model.

16. The device of claim 11, wherein the differentially private exploration tree comprises a node, the node is associated with a unique word in a public dataset, and the node is further associated with a query defined by a sequential walk from a root of the differentially private exploration tree to the node, and wherein the at least one processor is further configured to:
  determine a count of a number of times the query occurs in the public dataset.

17. The device of claim 16, wherein the at least one processor is further configured to add Laplacian noise to the count of the number of times the query occurs in the public dataset;
  wherein an amount of Laplacian noise added to the count is inversely proportional to a privacy parameter.

* * * * *